Patented Apr. 18, 1933

1,904,833

UNITED STATES PATENT OFFICE

JOHN IVO MAREK, OF PARIS, FRANCE, ASSIGNOR TO THE FIRM CARBONFIX, SOCIÉTÉ À RESPONSABILITÉ LIMITÉE, OF PARIS, FRANCE

MANUFACTURE OF A COAL SUBSTITUTE

No Drawing. Application filed October 27, 1930, Serial No. 491,636, and in Belgium November 8, 1929.

This invention relates to a process for the manufacture of an improved coal substitute practically free from ashes and consists in lignin being submitted, before or after carbonization by a dry or wet process, to a treatment with acids and thereupon to a treatment with alkalis, followed if desired by a further acid treatment.

As is well known lignin is found in large quantities in the waste lye of cellulose factories which employ the soda or the sulphate process. When this lye (the so-called black lye) or the washing liquor is treated with an acid, the lignin is precipitated and can be recovered for instance by decanting. For the purpose of the present process, the precipitation of lignin from the black lye and washing liquor is preferably effected by means of hydrochloric acid.

The lignin can also be obtained by other well known processes from wood, reeds and other cellulose-containing materials.

Crude lignin usually contains resin (colophony) as an impurity. This can be removed by extraction with oil of turpentine, which is well known as a solvent for colophony.

The turpentine solution may be distilled for the purpose of recovering the oil of turpentine, the colophony being left behind. The lignin extracted is washed with warm water and represents purified lignin.

Examples

1. Purified lignin is carbonized by dry distillation in retorts or chemically, for instance by an acid. After the carbonization, the mass is treated with sulphuric acid at 65° Bé. for about twelve hours at a temperature of 165 to 200° C. The excess sulphuric acid is removed, and the mass is then treated with a solution containing four parts of sodium carbonate and one part of potassium carbonate, whereupon it is washed with warm water. The washed mass is then treated with concentrated hydrochloric acid for eight to twelve hours. The product thus obtained is washed with warm water and then dried. The percentage of ashes in the resulting coal substitute can be less than 0.05%.

2. Purified lignin is treated in a hermetically closed lead apparatus with hydrofluoric acid. The excess hydrofluoric acid is removed, the product is washed with water and treated with a caustic alkali, for example caustic soda. After a second washing with warm water, the lignin is dried prior to carbonization with hydrochloric acid, a hermetically closed lead apparatus being used as before. The treatment with hydrochloric acid is normally continued for twelve hours. In order to obtain however a particularly black "coal", the treatment can be extended by several hours. After careful washing with warm water, the "coal" is allowed to dry.

In order to convert the product into a fine impalpable powder, it must be ground. It is also possible, and preferable to treat the "coal" for one to two hours with sulphuric acid after which it is washed with warm water and dried.

Having now particularly described and ascertained the nature of my said invention and in what manner the same is to be performed, I declare that what I claim is:—

1. A process for the manufacture of a coal substitute practically free of ash, characterized in that the lignin is first carbonized and then treated first with sulphuric acid of 65° Bé. at 165° to 200° C. and second with a solution of sodium and potassium carbonates, and finally with concentrated hydrochloric acid.

2. A process as claimed in claim 1, characterized in that lignin is treated with hydrofluoric acid and then with a lye containing caustic soda, before carbonization.

3. As a new product a coal substitute practically free of ash consisting of carbonized lignin substantially free of acid and alkali soluble materials.

In testimony whereof, I affix my signature.

JOHN IVO MAREK.